US008813488B2

(12) United States Patent
Gibson et al.

(10) Patent No.: US 8,813,488 B2
(45) Date of Patent: Aug. 26, 2014

(54) POWER GENERATION SYSTEM UTILIZING BUOYANT CHAMBER

(76) Inventors: Mark Gibson, Ayrshire (GB); Kennedy Ferguson, Ayrshire (GB); Donald Briggs, Ayrshire (GB)

(*) Notice: Subject to any disclaimer, the term of this patent is extended or adjusted under 35 U.S.C. 154(b) by 162 days.

(21) Appl. No.: 13/380,646

(22) PCT Filed: Jun. 23, 2010

(86) PCT No.: PCT/GB2010/001240
§ 371 (c)(1),
(2), (4) Date: Feb. 10, 2012

(87) PCT Pub. No.: WO2010/149972
PCT Pub. Date: Dec. 29, 2010

(65) Prior Publication Data
US 2012/0131914 A1 May 31, 2012

(30) Foreign Application Priority Data

Jun. 23, 2009 (GB) .................... 0910784.8
Jul. 2, 2009 (GB) .................... 0911463.8
Mar. 5, 2010 (GB) .................... 1003658.0

(51) Int. Cl.
*F03B 17/02* (2006.01)

(52) U.S. Cl.
CPC ............. *F03B 17/02* (2013.01); *F05B 2240/97* (2013.01); *Y02E 10/20* (2013.01)
USPC .......................................................... 60/496

(58) Field of Classification Search
CPC ........................................................ F03B 17/02
USPC ................................. 60/495–507, 639
See application file for complete search history.

(56) References Cited

U.S. PATENT DOCUMENTS

| 4,054,031 | A | | 10/1977 | Johnson | |
|---|---|---|---|---|---|
| 4,326,132 | A | * | 4/1982 | Bokel | 290/1 R |
| 4,573,319 | A | * | 3/1986 | Chichester | 60/422 |
| 5,485,724 | A | * | 1/1996 | Nozawa et al. | 60/421 |
| 5,899,066 | A | | 5/1999 | Brassea-Flores | |
| 6,018,947 | A | | 2/2000 | DeMarco | |

(Continued)

FOREIGN PATENT DOCUMENTS

CA 2328580 A1 * 6/2002
DE 197 30 252 A 1 1/1999

(Continued)

*Primary Examiner* — Thomas Denion
*Assistant Examiner* — Mickey France
(74) *Attorney, Agent, or Firm* — Young Basile Hanlon & MacFarlane P.C.

(57) ABSTRACT

A system for generating power is described. The system comprises a gas compressor, a reservoir for storing compressed gas and an apparatus adapted to be located within a body of a liquid. The apparatus comprises at least one chamber in fluid communication with the compressed gas reservoir and an output device. In use, a compressed gas is supplied to the/each chamber from the reservoir, the buoyancy of the gas applying an upward force to a portion of the chamber, the upward force moving at least a portion of the chamber from a first position to a second position, the movement of the at least a portion of the chamber adapted to drive the output device to provide a continuous apparatus output. In at least one embodiment of the invention, heat is extracted from the compressed gas for utilization in local heating systems.

29 Claims, 7 Drawing Sheets (56) References Cited

U.S. PATENT DOCUMENTS

| | | | |
|---|---|---|---|
| 6,990,809 B2 | 1/2006 | Abou-Raphael | |
| 2003/0145589 A1* | 8/2003 | Tillyer | 60/496 |
| 2005/0252206 A1* | 11/2005 | Holmevik et al. | 60/495 |
| 2006/0064975 A1 | 3/2006 | Takeuchi | |
| 2006/0218917 A1* | 10/2006 | Abou-Raphael | 60/495 |
| 2008/0083222 A1* | 4/2008 | Hubert | 60/698 |
| 2008/0264056 A1 | 10/2008 | Tung | |

FOREIGN PATENT DOCUMENTS

| | | | |
|---|---|---|---|
| EP | 1566542 A1 | | 8/2005 |
| FR | 2 864 174 | | 6/2005 |
| FR | 2864174 | * | 6/2005 |
| GB | 2337089 A | | 11/1999 |
| WO | 9636810 A1 | | 11/1996 |
| WO | 2007/140583 | | 12/2007 |
| WO | 2008/082221 | | 7/2008 |
| WO | 2008129515 A2 | | 10/2008 |
| WO | 2011008482 | | 1/2011 |

* cited by examiner

Fig 7

POWER GENERATION SYSTEM UTILIZING BUOYANT CHAMBER

CROSS-REFERENCE TO RELATED APPLICATIONS

The following application is a United States national stage application of International Patent Application No. PCT/GB2010/001240, filed on Jun. 23, 2010, which claims the benefit of United Kingdom application no. 1003658.0 filed on Mar. 5, 2010; United Kingdom application no. 0911463.8 filed on Jul. 2, 2009; and United Kingdom application no. 0910784.8 filed on Jun. 23, 2009.

FIELD OF THE INVENTION

The present invention relates to a system and a method for generating power. Particularly, but not exclusively, the present invention relates to a system and method of generating heat and power from intermittent power supplies.

BACKGROUND TO THE INVENTION

Alternatives to fossil fuel-based methods of generating power and heating are being implemented globally due to the environmental impact of extracting fossil fuels and the dwindling supplies. Various types of renewable energy generating devices have been proposed. Many of these devices suffer from the disadvantage of only being capable of supplying electricity intermittently. Wind powered turbines are only capable of producing electricity when the wind blows within a certain range of wind speeds. If the wind is too light, there is not sufficient wind to turn the turbine, and if the wind is too strong, use of the turbine in the high wind may damage the turbine.

Devices which utilise tidal power to generate electricity are also well known. These devices can also be intermittent in their supply of electricity. Not only are they dependent on tidal flows, and particularly flows in certain directions, but in the event of failure, they can be expensive to recover and repair. Maintenance delays further exacerbate the problem of intermittent supply.

Commercially, intermittent electricity supplies attract lower wholesale prices than continuous supplies, and accordingly, intermittent supplies such as that provided by wind turbines have to be subsidised to make them economically viable.

Another common problem associated with wind and tidal power systems is, generally, they are not suitable for location near population centres. Accordingly, the electricity they generate has to be transported significant distances, requiring a large infrastructure to be installed, and transmission losses occur.

A further issue with wind and tidal generation is there is no capacity to store the electricity they generate. Not only is the supply of electricity intermittent from these devices, in addition, the time of supply cannot be controlled. Consequently, they could be producing electricity at times of the day when their electricity is not required.

SUMMARY OF THE INVENTION

According to a first aspect of the present invention, there is provided a system for generating power, the system comprising:
 a gas compressor;
 a reservoir for storing compressed gas; and
 an apparatus adapted to be located within a body of a liquid, the apparatus comprising at least one chamber in fluid communication with the compressed gas reservoir and an output device;
 wherein, in use, a compressed gas is supplied to the at least one chamber from the reservoir, the buoyancy of the gas applying an upward force to a portion of the chamber, the upward force moving at least a portion of the chamber from a first position to a second position, the movement of the at least a portion of the chamber adapted to drive the output device to provide a continuous apparatus output.

In an embodiment to the present invention, a power generation system is provided which harnesses the effect of buoyancy to drive an apparatus output device, for example, rotate a shaft. This output can be utilised to generate electricity. By driving the apparatus from a reservoir of compressed gas, the output can be made continuous. Most advantageously, a non-continuous supply of electricity can be used to compress the gas and fill the reservoir and, if the reservoir is suitably large, a continuous supply of electricity can be generated from a non-continuous source of electricity. Furthermore, use of a reservoir allows electricity generated by intermittent renewable sources to be used, when available, to build up a body of gas in the reservoir, effectively storing the energy produced by the intermittent renewable source. The stored gas can be used to create electricity as and when required.

The output device may comprise an output shaft, movement of at least a portion of the chamber from the first position to the second position resulting in rotation of the apparatus output shaft. The rotating shaft can be attached directly to a generator to produce electricity.

In an alternative embodiment, the apparatus output device comprises a hydraulic system, movement of at least a portion of the chamber from the first position to the second position resulting in an increase of hydraulic pressure within the hydraulic system. An increase in hydraulic pressure can be applied to various devices to generate electricity.

In one embodiment, the apparatus output comprises a plurality of output shafts.

In one embodiment, there are a plurality of chambers.

In this embodiment, the chambers are arranged such that there is always at least one chamber moving between the first and second positions.

In this embodiment, the movement of at least one of the chambers from the first to the second position causes movement of at least one other chamber from the second position back to the first position.

In a preferred embodiment, there are equal numbers of chambers moving from the first position to the second position, as there are chambers moving from the second position back to the first position.

Each chamber may include an inlet and an outlet, the inlet and outlet being different.

The system may further comprise a gas conduit for the supply of gas from the reservoir to the chamber.

The gas conduit may include a pressure regulating valve. A pressure regulating valve may be provided to maintain a constant gas pressure supply to the apparatus. This allows a higher volume and pressure of gas to be stored within the reservoir, reducing the possibility of the gas supply failing.

Compressed gas may be supplied from the gas reservoir to the chamber through the inlet at the first position.

The/each chamber inlet may have a valve.

The valve may be a one-way valve.

The/each valve may be adapted to open when the chamber is in the first position and permit the supply of a volume of compressed gas from the gas conduit into the chamber with which it is associated. Once the volume of compressed gas has been supplied to the chamber, the valve closes or the movement of the chamber displaces the chamber inlet from the gas supply line.

The apparatus may comprise a valve actuator to actuate the/each valve when the chamber is in the first position.

In an embodiment as the chamber moves from the first to the second position, the gas expands expelling liquid through the outlet. The expulsion of liquid through the outlet will create a thrust effect, which further drives the apparatus.

In an embodiment, in an intermediate position, between the first position and the second position, the gas expulsion of the gas commences through the outlet. This may be due to the buoyancy of the gas and the relative position of the outlet to the pocket of gas.

In an embodiment, the chamber defines a volume, the gas, in use, occupying up to 75% of the volume of the chamber prior to reaching the intermediate position.

In an embodiment, the chamber defines a volume, the gas, in use, occupying up to 90% of the volume of the chamber prior to reaching the intermediate position.

In an embodiment when the chamber reaches the second position, all of the gas has been exhausted from the chamber.

In the second position, the chamber may be filled with liquid.

In an embodiment, the apparatus further comprises at least one vent, a vent being associated with each chamber.

The/each vent may be adapted to feed liquid from the body of liquid into the chamber. As the gas exits the chamber, it may try and draw a vacuum. A vent is provided to avoid this.

The vent may be arranged to feed liquid into the chamber, in use, behind the gas whilst the gas is being released through the chamber outlet.

In the first position, the/each chamber inlet may be above the/each chamber outlet, and in the second position, the/each chamber inlet may be below the/each chamber outlet.

In one embodiment, the apparatus further comprises a housing structure.

The chamber may be adapted to move with respect to the housing structure.

The movement of the chamber from the first position to the second position may be a rotational movement, a linear movement or a combination of rotational and linear movements.

The chamber may be attached to a frame, the frame being provided to support the chamber, and transmit movement of the chamber to the output shaft.

The chamber may be fixed to the frame.

In one embodiment as the frame rotates, the chamber rotates with the frame and is fixed relative to the frame. In this embodiment, there are no hinged connections, for example, between the chambers and the frame.

The frame may be a rotor.

The frame may be fixed to the output shaft such that the frame and the output shaft rotates together.

There may be multiple frames attached to a single output shaft.

In one embodiment, the/each chamber outlet is at an obtuse angle to a frame circumferential surface. Particularly, a section of the chamber surface which defines the outlet may be at an obtuse angle to the frame circumferential surface. Such an arrangement maximises a thrust effect, which is generated as the volume of gas expands and forces the fluid out of the chamber.

In one embodiment, as the gas expands in the chamber, the gas absorbs heat from the body of liquid. Such an arrangement injects further power into the system, making the system more efficient.

The apparatus may further comprise a gas recovery device adapted to capture the gas as it is released from the chamber.

The gas recovery device may be in fluid communication with the gas compressor, the gas recovery device being adapted to deliver the recovered gas to the gas compressor. As the gas is released from the chamber, it will still be pressurised to an extent, and it may be recovered through the gas capture device and fed back to the gas compressor inlet. As the gas is pressurised to an extent, this will reduce the amount of work the gas compressor is required to do to bring the gas to the required pressure.

The gas recovery device may include a sensor for sensing the volume of gas and/or the volume of water in the gas recovery device. This information can be fed back to the gas compressor to indicate whether or not sufficient gas has been recovered to maintain the required volume in the reservoir. If sufficient gas has not been recovered, then additional gas will need to be supplied.

The apparatus may include a diffuser. A diffuser may be provided to reduce the level of turbulence in the gas collected by the gas recovery device prior to delivery to the gas compressor.

The gas compressor and/or the reservoir may include a heat exchanger. As the gas is compressed and the temperature rises, heat can be extracted from the gas by a heat exchanger and stored. This heat can be used in, for example, local heating systems.

The power generation system may include a vessel adapted to receive the apparatus and house a body of liquid. Operating the apparatus within a vessel allows the system to be implemented in a population centre rather than in a remote environment. Locating the system close to centres of population reduces the transmission losses and heat losses (if heat is recovered), which can occur moving electricity and heat over large distances.

The gas recovery device may be connected to the vessel.

In one embodiment, the system further comprises an intermittent power source for driving the gas compressor. An intermittent power source, such as wind turbines, can be used when available to drive the gas compressor and fill or top up the gas reservoir. As long as the gas reservoir is maintained at above a minimum operational fill level, the system will produce a continuous supply of electricity.

In this embodiment or an alternative embodiment, the system further comprises a continuous power source for driving the gas compressor. It may be decided to use a continuous power source to drive the gas compressor. This may be advantageous in a situation where the gas compressor can be driven at times when the electricity is cheap (such as at night) to build up a volume of gas in the reservoir which can then be used to generate electricity when electricity is expensive.

According to a second aspect of the present invention, there is provided a method of generating power, the method comprising the steps of:

supplying a compressed gas from a reservoir to an apparatus located within the body of a liquid;

supplying the compressed gas to at least one apparatus chamber at a first position, the buoyancy of the gas applying an upward force to a portion of the chamber, the upward force moving at least a portion of the chamber to a second position;

utilising the movement of the/each chamber portion to continuously drive an apparatus output.

According to a third aspect of the present invention, there is provided an apparatus for use in a power generation system, the apparatus comprising:

a housing;

an output shaft; and a plurality of chambers mounted to the output shaft, each chamber having an inlet and an outlet, the inlet and the outlet being different, each chamber being movable with respect to the housing, from a first position to a second position;

wherein, in use, when a chamber is in the first position, a volume of compressed gas is supplied to the chamber through the housing inlet, the buoyancy of the gas applying an upward force to the chamber, moving the chamber from the first position to the second position, as the chamber moves to the second position, the gas expands and exits the chamber through the chamber outlet.

In an embodiment of the present invention, providing both an inlet and an outlet to each chamber allows the gas to pass through the chamber efficiently.

In an embodiment, each chamber is vented. A vent is provided to avoid the exits of the gas pulling a vacuum.

According to a fourth aspect of the present invention, there is provided a method of generating a rotational output, the method comprising the steps of:

providing an apparatus comprising a housing, an output shaft and a plurality of chambers mounted to the output shaft;

supplying a compressed gas to an apparatus chamber through a chamber inlet, the buoyancy of the gas applying an upward force to the chamber, the upward force moving the chamber from a first position to a second position, as the chamber moves to the second position, the gas expands and exits through a chamber outlet; and utilising the movement of each chamber from the first position to the second position to drive an output shaft.

According to a fifth aspect of the present invention, there is provided a method of generating power, the method comprising:

compressing a gas to a first pressure and a first temperature;

extracting heat from the gas to reduce the gas temperature to a second temperature;

supplying the gas to an apparatus chamber, the apparatus being located within a fluid at a second pressure and a third temperature, the first pressure being higher than the second pressure and the third temperature being lower than the second temperature;

permitting the gas to expand within the chamber, such that as the gas expands, the gas applies an upward force to the chamber due to buoyancy, the apparatus being arranged such that the upward force is harnessed by the apparatus to produce an output.

In an embodiment of the present invention, expanding the gas in a chamber surrounded by liquid at a higher temperature will cause a heat transfer from the surrounding liquid into the gas. This is a useful way of extracting heat from, for example, the sea.

In one embodiment, the output is continuous.

In one embodiment, the method further comprises the step of providing a gas compressor powered by an intermittent source of power.

Alternatively, the method may comprise the step of providing a gas compressor powered by both an intermittent source of power.

Alternatively, the method may comprise the step of providing a gas compressor powered by both an intermittent source of power and a continuous source of power.

The method may further comprise the step of storing the compressed gas in a gas reservoir.

The gas may be supplied to the apparatus chamber from the gas reservoir.

According to a sixth aspect of the present invention, there is provided a method of generating power, the method comprising the steps of:

utilising an intermittent supply of power to compress a gas;
storing the compressed gas in a reservoir;
using the compressed gas to drive an apparatus having a continuous output; and
using the continuous output to generate a continuous electrical supply.

In one embodiment, such an arrangement permits electricity to be generated continuously from non-continuous sources of power.

The method may further comprise the step of utilising a continuous supply of power to compress the gas.

The method may further comprise the step of recovering the heat from the compressed gas by means of a heat exchanger.

According to a seventh aspect of the present invention, there is provided an apparatus for compressing gas, the apparatus comprising:

a gas compressor;
a reservoir of restoring compressed gas; and
a heat exchanger for extracting heat from the compressed gas.

It will be understood that preferred or alternative features listed in connection with one aspect may equally be applied to other aspects, if appropriate, and have not been repeated for brevity.

BRIEF DESCRIPTION OF THE DRAWINGS

Embodiments of the present invention will now be described with reference to the accompanying drawings in which.

DETAILED DESCRIPTION OF THE DRAWINGS

Figure 1:
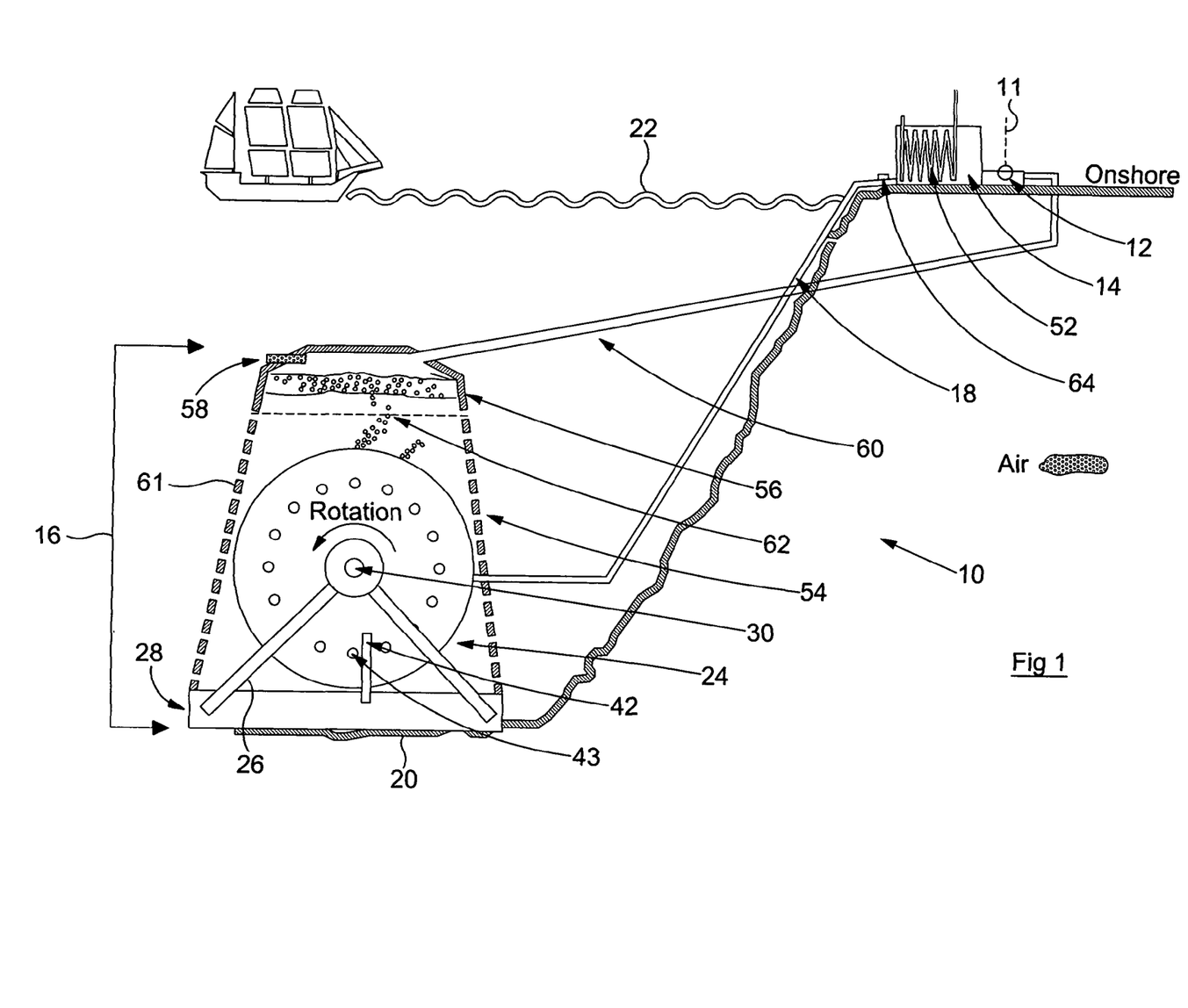
FIG. 1 is a schematic of a power generation system according to a first embodiment of the present invention.

Reference is firstly made to FIG. 1, a schematic of a system for generating power, generally indicated by reference numeral 10, according to a first embodiment of the present invention. The power generation system 10 generates power from non-continuous sources of power and, in addition, generates heat for use in local heating systems.

The power generation system 10 comprises a gas compressor 12 supplying a reservoir 14 for storing compressed gas, in this case compressed air. The gas compressor 12 is powered by non-continuous sources of power such as wind turbines (not shown) and, if required, continuous sources of power such as is available from the National Grid. The incoming power is supplied to the gas compressor 12 through a connector 11. The reservoir 14 is connected to a subsea apparatus 16 via a gas pipe 18. The apparatus 16 is located on the seabed 20 beneath the water surface 22. The gas pipe 18 includes a pressure-regulating valve 64 adapted to maintain a constant air pressure supply to the apparatus 16, thereby allowing a higher volume and pressure of air to be stored within the reservoir 14.

The apparatus 16 comprises a frame 24 which is attached to an output shaft 30, the output shaft 30 being rotationally mounted to a structure 26. The structure 26 is attached to an apparatus base 28.

Figure 2:
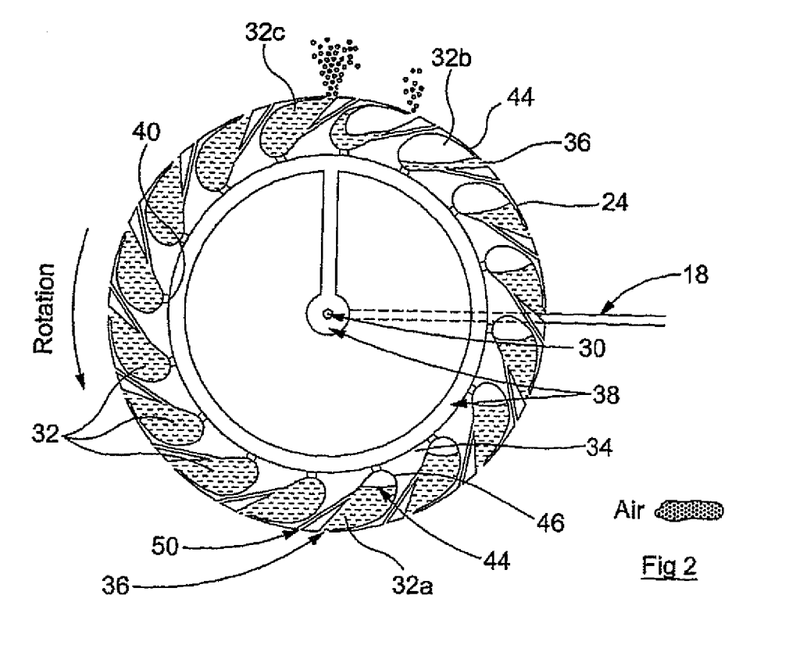
FIG. 2 is a schematic of a section through the drum of FIG. 1.

Referring to FIG. 2, a schematic view of a section through the frame 24, the frame 24 comprises sixteen chambers 32, each chamber has an inlet 34 and an outlet 36. The chamber inlets 34 are connected to a gas supply line 38 which, in turn, is connected to the reservoir 14 via the gas pipe 18.

Figure 3:
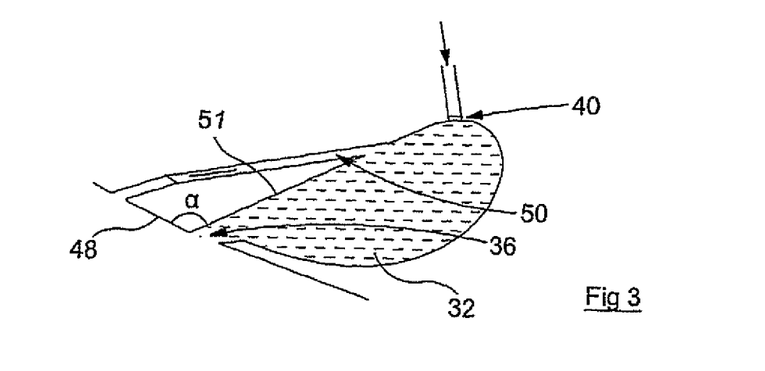
FIG. 3 is a schematic of a section through a chamber of the drum of FIG. 2.

Each of the chamber inlets 34 includes a one-way inlet valve 40 (only shown for one of the chambers 32 on FIG. 2, but shown more clearly on FIG. 3, a schematic of one of the chambers 32 of FIG. 2). Referring back to FIG. 1, the apparatus 16 includes a static trigger 42 and sixteen valve actuators 43. Each valve actuator 43 is adapted to open an inlet valve 40 upon contact with the static trigger 42. In one rotation of the frame 24, the static trigger 42 will engage each actuator once, triggering each inlet valve 40 once.

When the valve actuator 43 opens the inlet valve 40, a volume of compressed air or gas 44 enters the chamber 32. Particularly, this is shown in FIG. 2 with respect to the first chamber 32A. In this first position, the air 44 is compressed and is at a higher pressure than the pressure of the water surrounding the apparatus 16.

Two effects contribute to the rotation of the frame 24 from this first position. First, the buoyancy of the volume of air 44 provides an upward force against the upper chamber surface 46 and the frame 24, which creates a rotational force, causing the frame 24 and the output shaft 30 to rotate. The second effect is caused by the expansion of the volume of gas 44. As the gas expands, the water in the chamber 32A is forced out of the chamber outlet 36, creating a thrust force. Referring to FIG. 3, the angle "α" between the frame circumferential surface 48 and the rear surface 51 of the chamber 32 is obtuse to maximise the thrust effect.

As the frame 24 rotates, the volume of air 44 expands to fill up to 90% of the volume of the chamber 32. Further around the frame 24, a second chamber 32B (FIG. 2) has reached this intermediate position, approaching the top of the rotation. At this point, the frame 24 has rotated sufficiently for the volume of gas 44 to be adjacent to the chamber outlet 36. Continued rotation beyond the intermediate position results in the volume of air 44 escaping from the chambers 32.

To facilitate the escape of the gas 44, each of the chambers 32 includes a vent 50. The vent 50 allows water to flow into the chambers 32 behind the volume of air 44 as the air 44 escapes.

A third chamber 32C is shown approaching a second position in which the chamber 32C is full of liquid once more and all of the air 44 has been exhausted. As the frame 24 continues to rotate, the chambers 32 which are filled with liquid move from the second position back to the first position where the process starts again.

Such an arrangement provides a power generation system 10 which harnesses the effect of buoyancy to drive an apparatus output shaft 30. The rotation of the output shaft 30 can be utilised by, for example, a generator to generate electricity. As the compressed gas is supplied from a reservoir, the supply of electricity can be constant. The gas compressor 12 can compress gas for storage in the reservoir 14 when power is available from intermittent sources of power such as wind turbines or tidal flow turbines. The gas compressor can also be powered by continuous sources of electricity in the event that the intermittent sources are unavailable and the air supply in the reservoir is depleted. In this way, a continuous output can be achieved from the power generation system 10.

The power generation system 10 can also be used to generate heat for local heating systems. Referring back to FIG. 1, the reservoir 14 includes a heat exchanger 52, which is adapted to extract heat from the compressed air. As the air is compressed, the temperature increases, and the heat exchanger can extract this heat. This heat can be used to heat buildings and the like in the vicinity of the power generation system 10. If sufficient heat is removed from the air in the reservoir 14 such that the temperature of the air is lower than the temperature of the sea water, then during the subsequent expansion of the gas in the chambers 32, heat will transfer from the seawater into the volume of gas, extracting energy from a renewable source.

The apparatus 16 further includes a cage 54 which supports a gas collector 56. The gas collector 56 captures the exhaust gases, which are still slightly pressurised, and returns the exhaust gas via a gas return pipe 60 to the gas compressor 12. The gas collector 56 includes a water level sensor 58, which provides feedback to the gas compressor 12 that there is insufficient air in the system based on the level of water within the gas collector 56.

The cage 54 includes a mesh 61 adapted to prevent ingress of sea animals and debris. Attached to the top of the cage 54 is a diffuser 62 for reducing the level of turbulence in the flow of exhaust gas from the frame 24.

Figure 4:
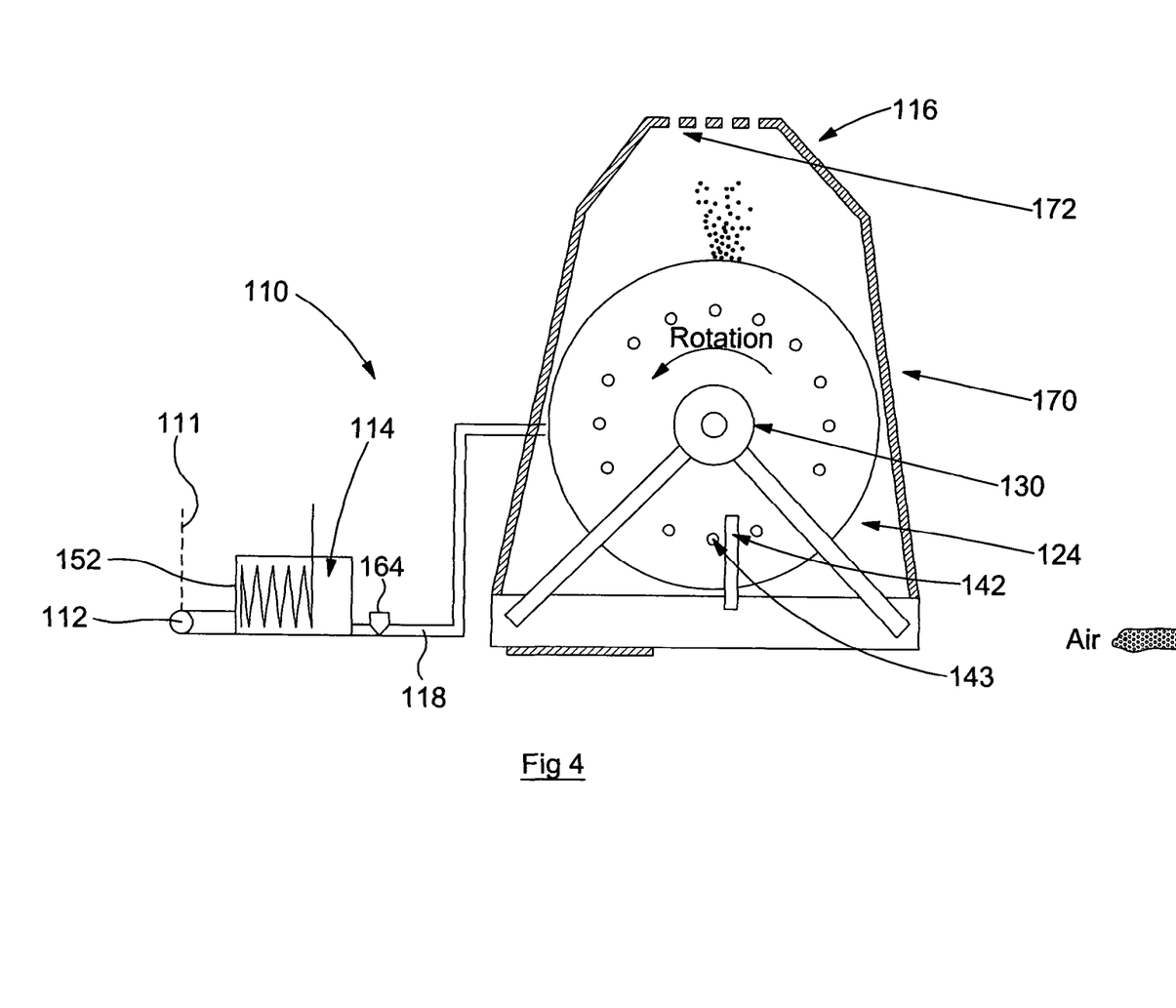
FIG. 4 is a schematic of a power generation system according to a second embodiment of the present invention.

Reference is now made to FIG. 4, a schematic of a system for generating power 110 according to a second embodiment of the present invention. Many of the features of the second embodiment are similar to the first embodiment; however, the second embodiment is land-based rather than a subsea installation.

In this embodiment, the apparatus 116 is housed within a vessel 170 filled with water. The operation of the system 110 is essentially the same as the power generation system 10 of the first embodiment. It will be noted, however, that the vessel 170 has an open top covered by a mesh 172 which prevents the ingress of birds etc. In this embodiment, the exhaust gas is not captured.

Figure 5:
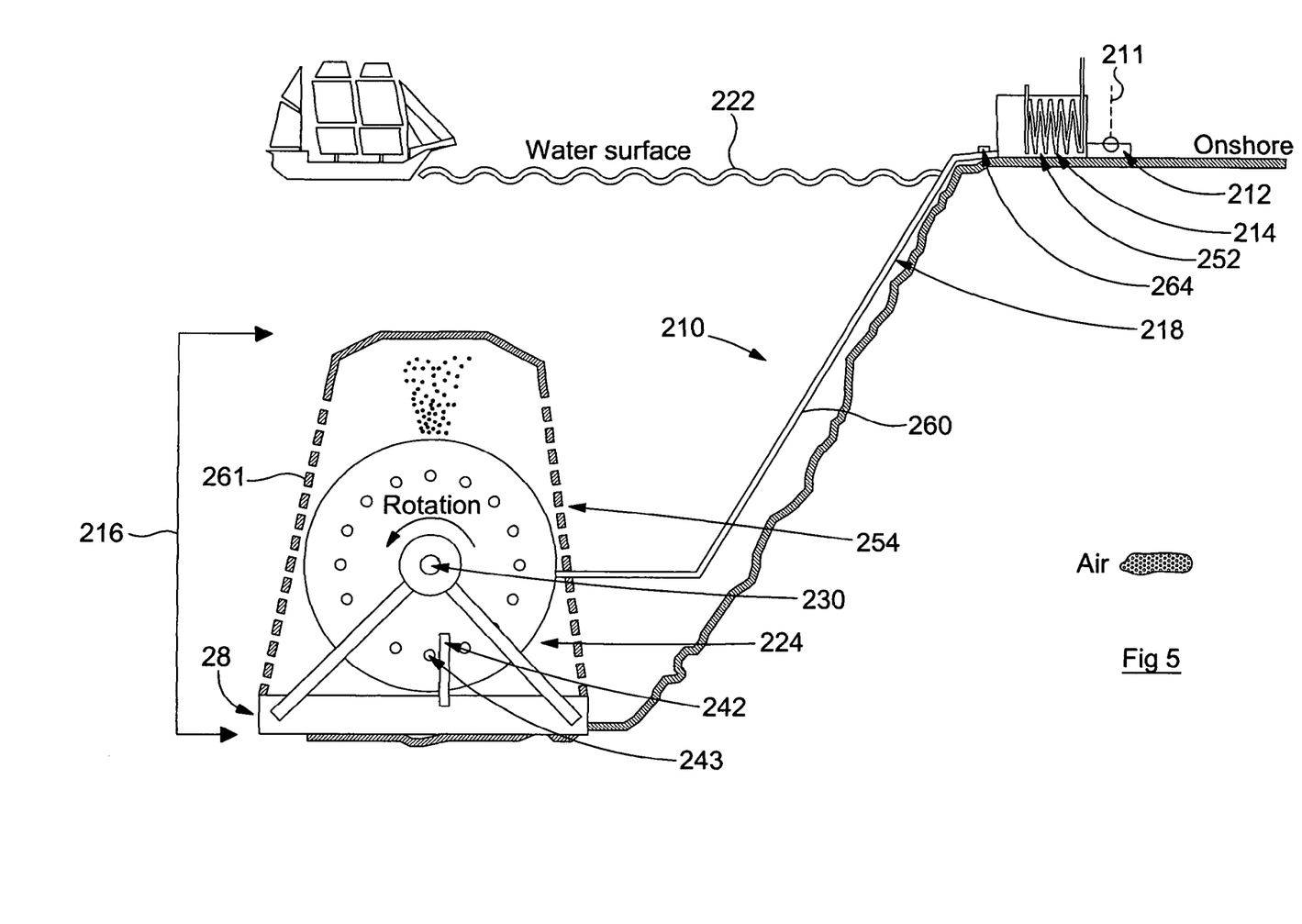
FIG. 5 is a schematic of a power generation system according to a third embodiment of the present invention.

FIG. 5 is a schematic of a power generation system 210 according to a third embodiment of the present invention. In this embodiment, once again, the exhaust gases are not captured and are vented surface. The cage 254 is a mesh 261 which encloses the apparatus 216.

Figure 6:
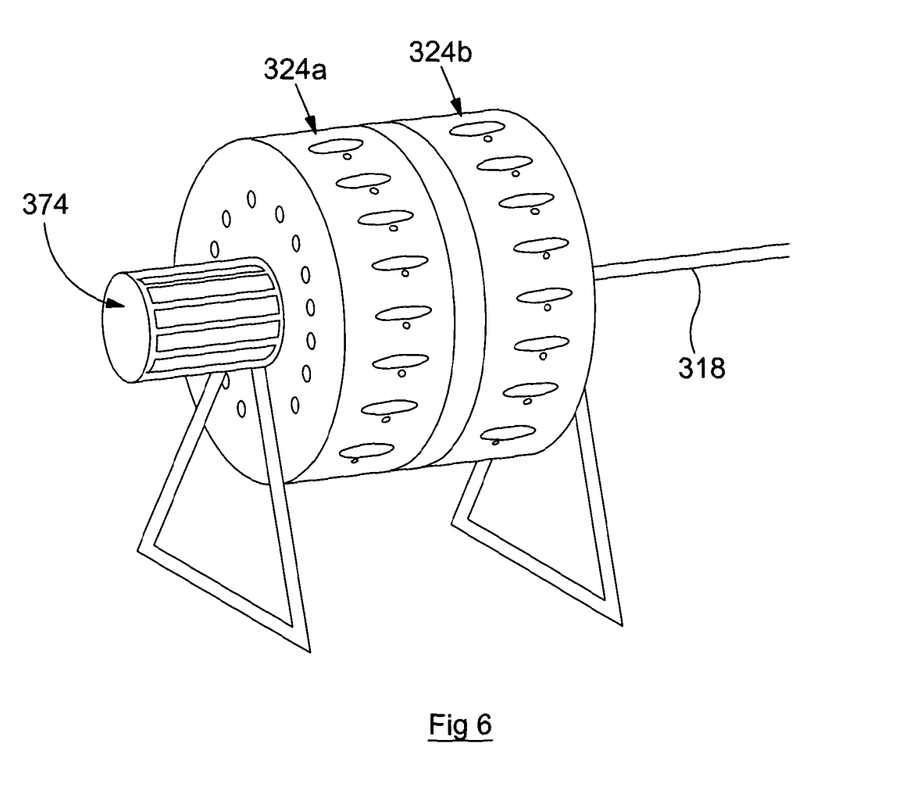
FIG. 6 is a perspective view of an apparatus for use in the power generation system of FIG. 1 according to a fourth embodiment of the present invention.

FIG. 6 is a perspective view of an apparatus 316 for use in a power generation system according to a fourth embodiment of the present invention.

The apparatus 316 comprises a first frame 324a and a second frame 324b, both connected to the output shaft (not visible). The output shaft is attached to a generator 374 mounted to the apparatus structure 326. Having multiple frames 324a, b attached to the one shaft will result in increased torque. By increasing torque, a larger capacity generator can be installed.

Figure 7:
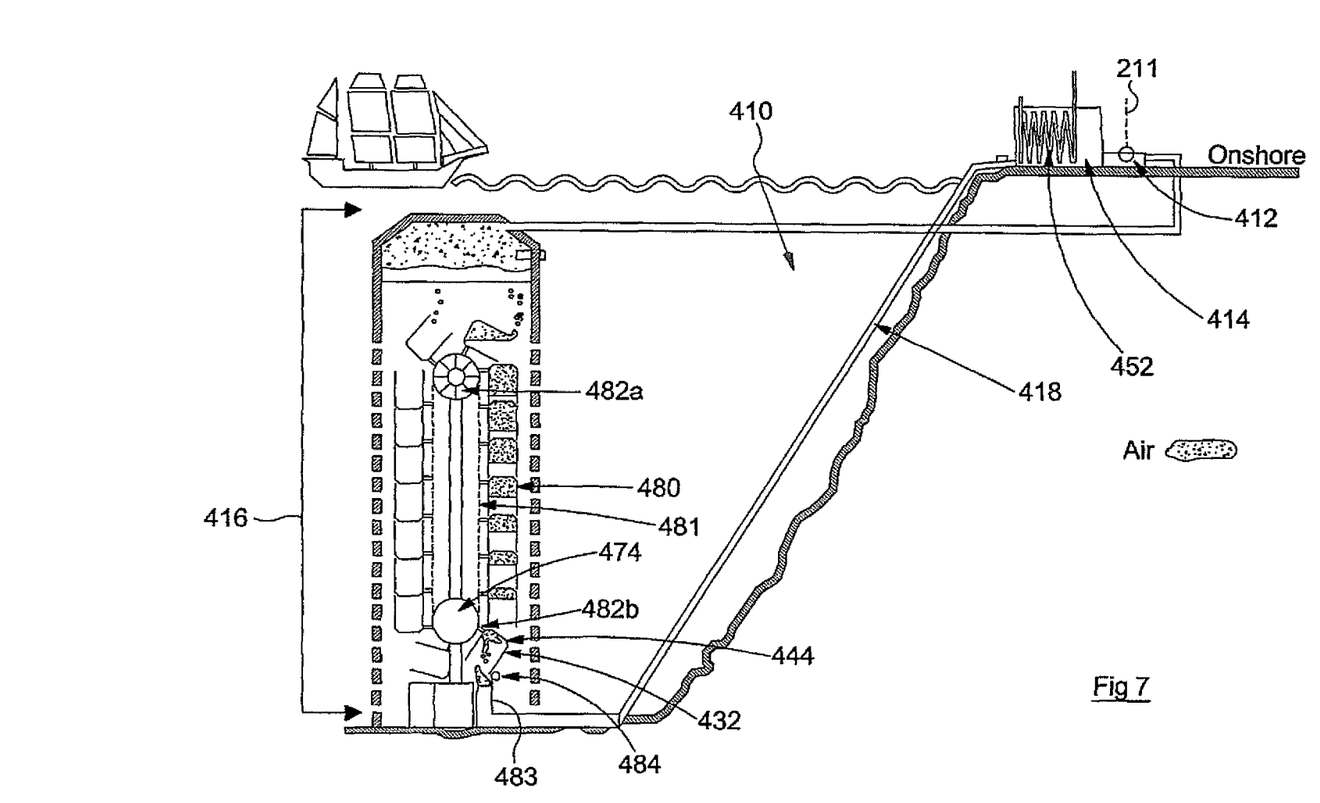
FIG. 7 is a schematic of a power generation system according to a fifth embodiment of the present invention.

FIG. 7 is a schematic of a power generation system 410 according to a fifth embodiment of the present invention. In this embodiment, the apparatus 416 comprises a lift 480. The lift comprises a chain 481 which wraps around a first pulley 482a and a second pulley 482b. Attached to the chain 481 are eighteen chambers 432. Compressed air is supplied to the apparatus 416 through the gas pipe 418. As each chamber 432 passes the end of the gas pipe 483, the chamber 432 opens a hinged valve 484 releasing a volume of compressed air 444 into the chamber 432.

The volume of air 444 expands, and the buoyancy effect drives the pulleys 482 causing the chain 481 and the chambers 432 to rotate around the pulleys 482. At the top of the rotation, each chamber 432 flips over the upper pulley 482a, and the volume of air 444 is released.

The lower pulley 482b is attached to a generator 474 which generates electricity from the rotation of the lower pulley 482b.

Figure 8:
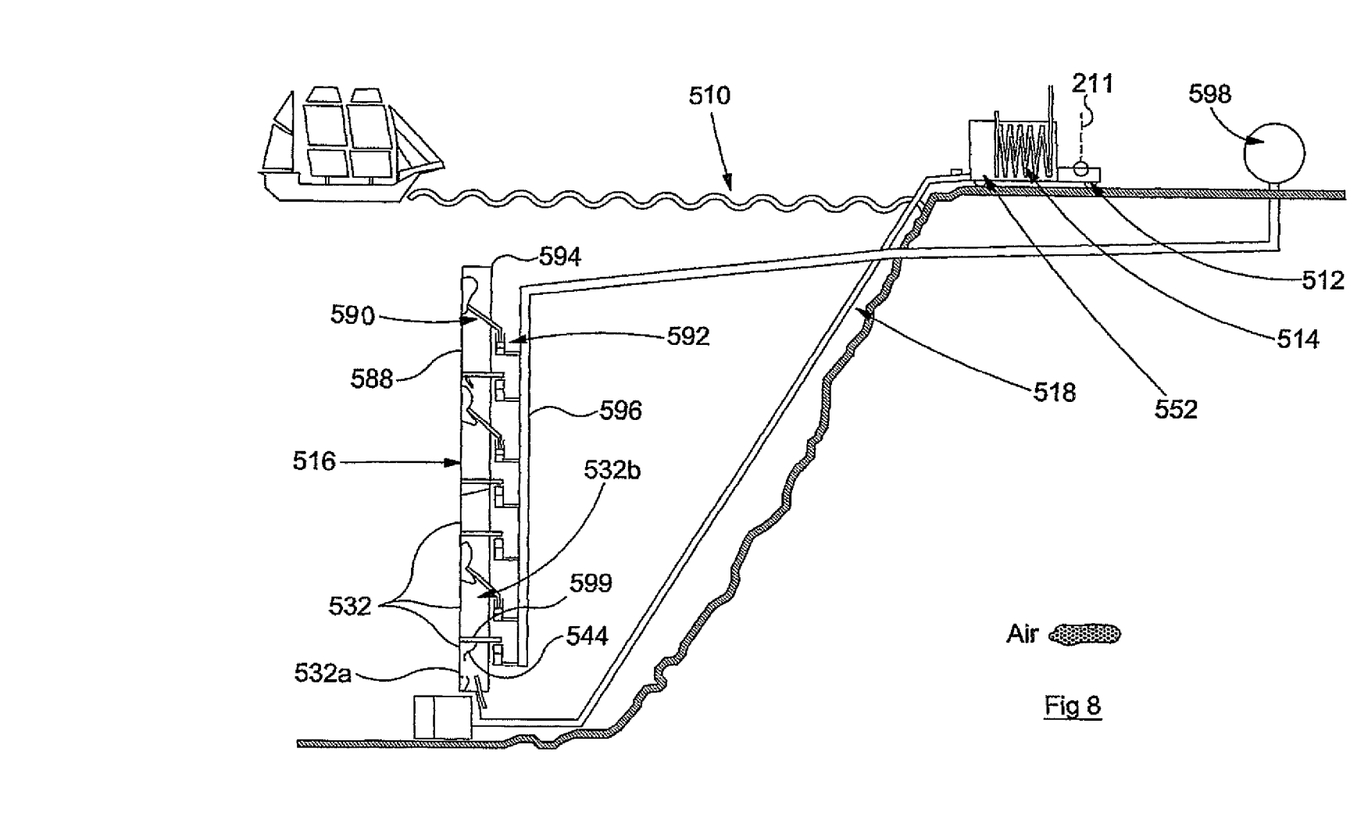
FIG. 8 is a schematic of a power generation system according to a sixth embodiment of the present invention.

FIG. 8 is a schematic of a power generation system 510 according to a sixth embodiment of the present invention. The apparatus 516 of this embodiment comprises a column 588 divided into seven sequential chambers 532. The upper boundary of each chamber 532 is a hinged flap 590, which is attached to a piston 592.

The system 510 operates as follows. A volume of air 544 is released from the gas pipe 518 into the first chamber 532a. The volume of air 544, under the force of buoyancy, pushes the hinged flap 590 upwards, and the volume of air 544 escapes into the second chamber 532b. The volume of air 544 progresses up the apparatus chambers 532 before exhausting to surface out of the top 594 of the apparatus 516.

Each time a flap 590 is displaced by the volume of air 544, the piston 592 associated with the displaced flap 590 applies pressure to a hydraulic fluid in a hydraulic fluid line 596, which, in turn, drives a generator 598, thereby producing electricity.

Various modifications and improvements may be made to the above-described embodiments without departing from the scope of the invention. For example, although the systems described comprise a single apparatus, multiple apparatuses could be linked to the same generator or the same air reservoir.

The fifth embodiment describes an arrangement in which the chambers are attached to a chain. In some alternative embodiments, the chain could be a belt.

Some embodiments are described as being subsea. They could equally be used in other large bodies of water such as lakes.

The invention claimed is:

1. A system for generating power, the system comprising:
a gas compressor;
a reservoir for storing compressed gas; and
an apparatus adapted to be located within the body of a liquid, the apparatus comprising
at least one chamber in fluid communication with the compressed gas reservoir and an output device,
wherein the at least one chamber is fixed to a rotor rotatable about an output shaft,
wherein, in use, a compressed gas is supplied to the at least one chamber from the reservoir, the buoyancy of the gas applying an upward force to a portion of the at least one chamber, the upward force moving at least a portion of the at least one chamber from a first position to a second position, the movement of the at least a portion of the at least one chamber adapted to drive the output device to provide a continuous apparatus output,
wherein the at least one chamber includes an inlet and an outlet, the inlet and outlet being separate,
wherein the inlet has at least one valve adapted to open when the at least one chamber is in the first position and permit the supply of a volume of compressed gas into the at least one chamber, wherein the apparatus comprises a valve actuator to actuate the/each valve when the at least one chamber is in the first position, wherein the at least one chamber defines a volume, the gas, in use, occupying up to 90% of the volume of the at least one chamber prior to reaching an intermediate position wherein expulsion of the gas commences through the outlet, the intermediate position being between the first position and the second position, and wherein as the gas expands in the at least one chamber, the gas absorbs heat from the body of the liquid.

2. The system of claim 1, wherein the output device comprises at least one output shaft, movement of at least a portion of the at least one chamber from the first position to the second position resulting in rotation of at least one output shaft.

3. The system of claim 1, wherein the apparatus output device comprises a hydraulic system, movement of at least a portion of the at least one chamber from the first position to the second position resulting in an increase of hydraulic pressure within the hydraulic system.

4. The system of claim 1, wherein a plurality of chambers are arranged such that there is always at least one chamber moving between the first and second positions.

5. The system of claim 1, wherein the movement of at least one of the chambers from the first to the second position causes movement of at least one other chamber from the second position back to the first position.

6. The system of claim 5, wherein there are equal numbers of chambers moving from the first position to the second position as there are chambers moving from the second position back to the first position.

7. The system of claim 1, wherein the system further comprises a gas conduit for the supply of gas from the reservoir to the at least one chamber.

8. The system of claim 7, wherein the gas conduit includes a pressure regulating valve.

9. The system of claim 1, wherein the system further comprises a gas conduit for the supply of gas from the reservoir to the at least one chamber, and compressed gas is supplied from the gas reservoir to the at least one chamber through the inlet at the first position.

10. The system of claim 1, wherein the at least one chamber inlet has a one-way valve.

11. The system of claim 1, wherein as the at least one chamber moves from the first to the second position, the gas expands expelling liquid through the outlet.

12. The system of claim 1, wherein when the at least one chamber reaches the second position, all of the gas has been exhausted from the chamber, and the at least one chamber is filled with liquid.

13. The system of claim 1, wherein the apparatus further comprises at least one vent, a vent being associated with each chamber.

14. The system of claim 13, wherein the/each vent is adapted to feed liquid from the body of liquid into the chamber, in use, behind the gas whilst the gas is being released through the chamber outlet.

15. The system of claim 1, wherein in the first position, the/each chamber inlet is above the/each chamber outlet, and in the second position, the/each chamber inlet is below the/each chamber outlet.

16. The system of claim 1, wherein the apparatus further comprises a housing structure, wherein the at least one chamber is adapted to move with respect to the housing structure.

17. The system of claim 1, wherein the movement of the at least one chamber from the first position to the second position is a rotational movement, a linear movement or a combination of rotational and linear movements.

18. The system of claim 1, wherein the frame is fixed to the output shaft such that the frame and the output shaft rotates together and, as the frame rotates, the at least one chamber rotates with the frame and is fixed relative to the frame.

19. The system of claim 1, wherein the/each chamber outlet is at an obtuse angle to a frame circumferential surface.

20. The system of claim 1, wherein the apparatus further comprises a gas recovery device adapted to capture the gas as it is released from the at least one chamber.

21. The system of claim 20, wherein the gas recovery device is in fluid communication with the gas compressor, the gas recovery device being adapted to deliver the recovered gas to the gas compressor.

22. The system of claim 20, wherein the gas recovery device includes a sensor for sending a volume of gas and/or a volume of water in the gas recovery device.

23. The system of claim 1, wherein the apparatus includes a diffuser.

24. The system of claim 1, wherein the gas compressor and/or the reservoir includes a heat exchanger.

25. The system of claim 1, wherein the power generation system includes a vessel adapted to receive the apparatus and house a body of liquid.

26. The system of claim 20, wherein the power generation system includes a vessel adapted to receive the apparatus and house a body of liquid, and the gas recovery device is connected to the vessel.

27. The system of claim 1, wherein the system further comprises an intermittent power source for driving the gas compressor.

28. A method of generating power, the method comprising the steps of:
supplying a compressed gas from a reservoir to an apparatus located within the body of a liquid, wherein the apparatus comprises an output device, and at least one chamber fixed to a rotor rotatable about an output shaft, wherein the at least one chamber includes an inlet and an outlet, the inlet and outlet being separate, wherein the inlet has at least one valve adapted to open when the at least one chamber is in a first position and permit the supply of a volume of compressed gas into the at least one chamber, wherein the apparatus comprises a valve actuator to actuate the/each valve when the at least one chamber is in the first position, wherein the at least one chamber defines a volume, the gas, in use, occupying up to 90% of the volume of the at least one chamber prior to reaching an intermediate position, wherein expulsion of the gas commences through the outlet, the intermediate position being between the first position and a second position;
supplying the compressed gas to the at least one chamber at the first position, the buoyancy of the gas applying an upward force to a portion of the at least one chamber, the upward force moving at least a portion of the at least one chamber to the second position; and
utilising the movement of the at least one chamber portion to continuously drive the output device,
wherein as the gas expands in the at least one chamber, the gas absorbs heat from the body of liquid.

29. An apparatus for use in a power generation system, the apparatus comprising:
a housing;
an output shaft; and
a plurality of vented chambers mounted to a rotor rotatable about the output shaft,
each chamber having an inlet and an outlet, the inlet and the outlet being separate, each chamber being movable with respect to the housing, from a first position to a second position,
wherein, in use, when a chamber is in the first position, a volume of compressed gas is supplied to the chamber through the inlet via at least one valve,
wherein the apparatus comprises a valve actuator to actuate the/each valve when the chamber is in the first position, the buoyancy of the gas applying an upward force to the chamber, moving the chamber from the first position to the second position, and as the chamber moves to the second position, the gas expands and exits the chamber through the chamber outlet,
wherein the chamber defines a volume, the gas, in use, occupying up to 90% of the volume of the chamber prior to reaching an intermediate position, wherein the gas exits the chamber through the outlet, the intermediate position being between the first position and the second position, and
wherein as the gas expands in the chamber, the gas absorbs heat from a body of liquid.

* * * * *

UNITED STATES PATENT AND TRADEMARK OFFICE
CERTIFICATE OF CORRECTION

| | | |
|---|---|---|
| PATENT NO. | : 8,813,488 B2 | Page 1 of 1 |
| APPLICATION NO. | : 13/380646 | |
| DATED | : August 26, 2014 | |
| INVENTOR(S) | : Gibson et al. | |

It is certified that error appears in the above-identified patent and that said Letters Patent is hereby corrected as shown below:

In the Specification

1. In Column 5, Line 56, please delete the word "both."

Signed and Sealed this
Thirtieth Day of December, 2014

Michelle K. Lee
*Deputy Director of the United States Patent and Trademark Office*